May 23, 1950     G. A. KENDALL     2,508,610
TRAILER FIFTH WHEEL
Filed Oct. 19, 1946     2 Sheets-Sheet 1
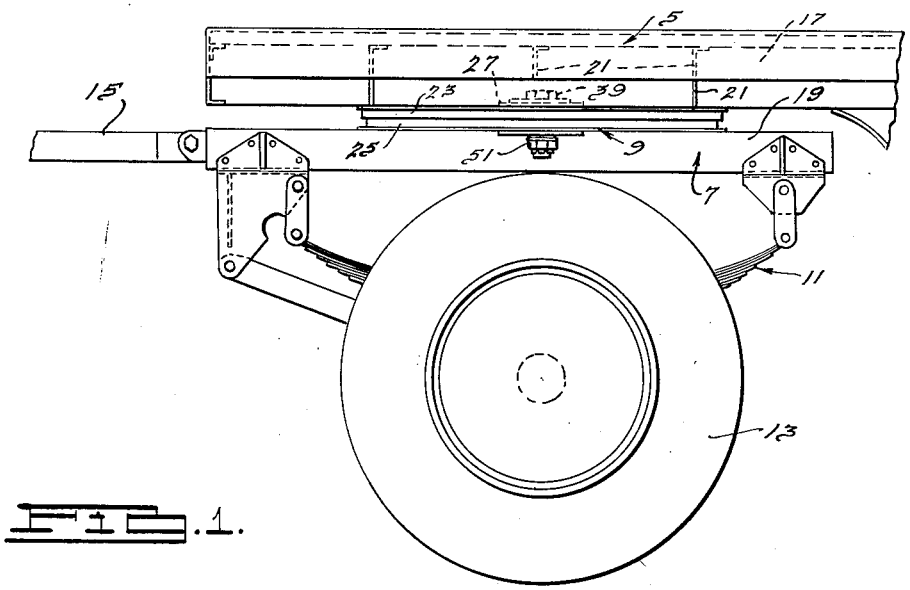
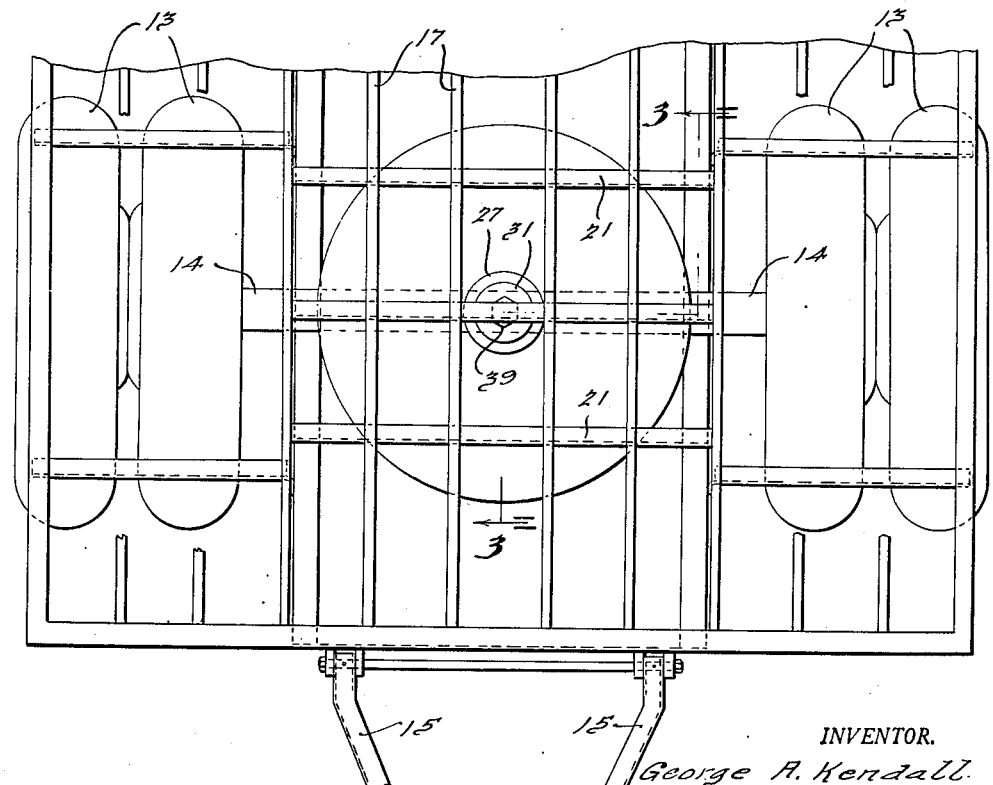
INVENTOR.
George A. Kendall
BY
Harness, Dickey & Pierce
ATTORNEYS.

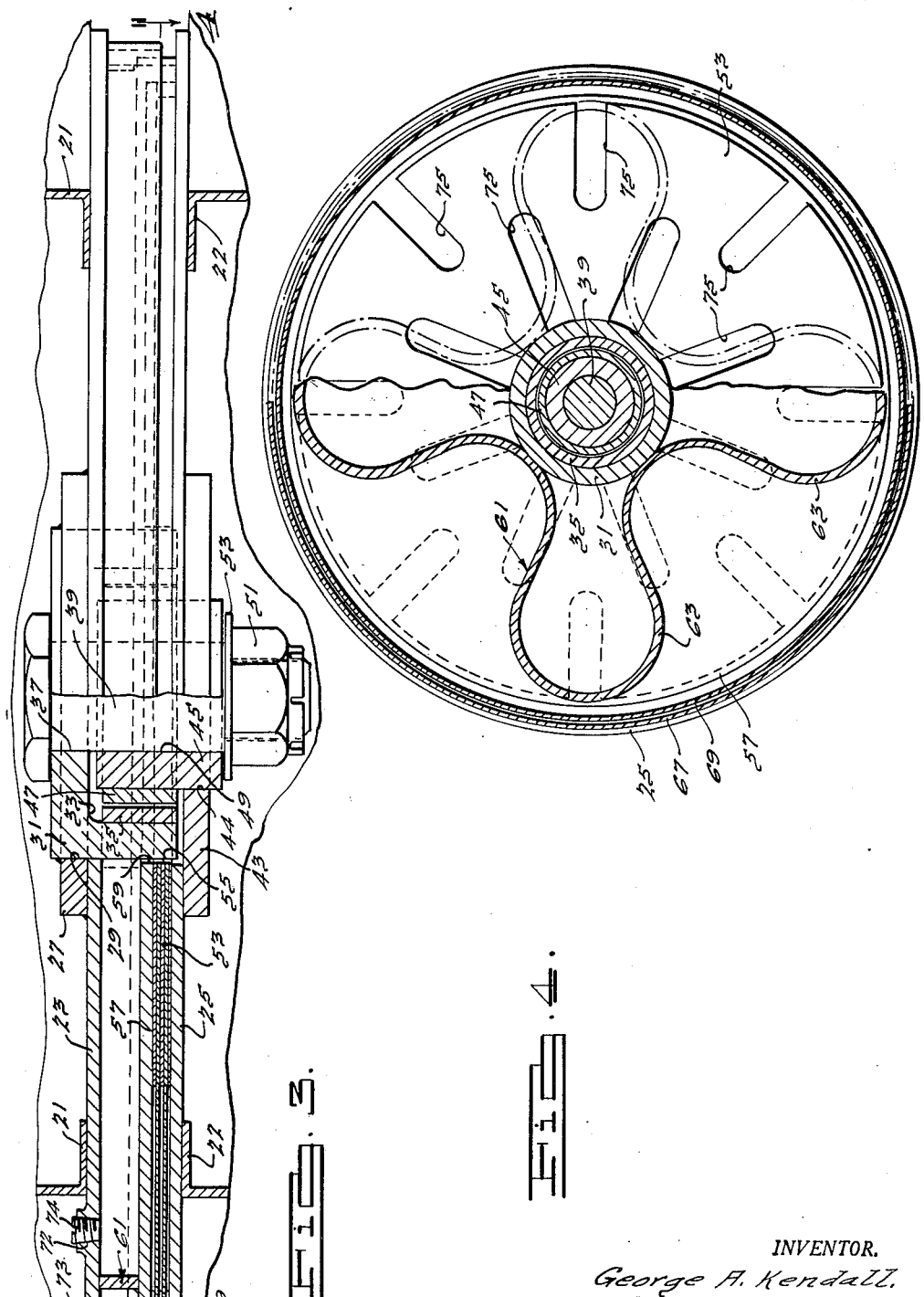

Patented May 23, 1950

2,508,610

UNITED STATES PATENT OFFICE 2,508,610

TRAILER FIFTH WHEEL

George A. Kendall, Detroit, Mich.

Application October 19, 1946, Serial No. 704,462

3 Claims. (Cl. 280—125)

This invention relates to a fifth wheel construction for trailers, vehicles, and the like, and more particularly to a fifth wheel for rotatively mounting a vehicle body to a vehicle wheel supporting frame.

It is an object of this invention to provide a fifth wheel construction which will wear longer, operate more smoothly, and eliminate the need of constant lubrication.

It is a further object of this invention to provide a fifth wheel, having a sealed housing which prevents the ingress of dirt and other foreign material onto the operating surfaces thereof.

It is a still further object of this invention to provide in a fifth wheel, including a sealed housing containing lubricant, large bearing surfaces to distribute the load thereof so that the fifth wheel will wear longer.

It is a still further object of this invention to provide a sealed housing containing lubricant so as to better lubricate all the operating parts thereof and eliminate the need for constant lubrication during operation.

These and other objects of this invention will become more apparent from the following detailed description when taken in conjunction with the accompanying drawings in which:

Figure 1 is a side elevational view of a vehicle body mounted to the wheel supporting frame through the fifth wheel of this invention.

Figure 2 is a plan view of the fifth wheel mounted on a vehicle.

Figure 3 is a cross sectional view on a larger scale of the construction of the fifth wheel of this invention taken along the line 3—3 of Figure 2.

Figure 4 is a horizontal cross sectional view on a smaller scale of the fifth wheel construction taken along the line 4—4 of Figure 3.

Referring to the drawings, it will be seen that a vehicle body frame generally indicated at 5 is connected to a wheel supporting frame 7 through a fifth wheel generally indicated at 9. The wheel supporting frame 7 is conventionally connected through a suspension system generally indicated at 11 to the front wheels 13 of the vehicle. As seen in Figure 2, the fifth wheel 9 is centrally located between the front wheels 13 of the vehicle and is located over the axle 14 therebetween. The front end of the wheel supporting frame 7 is connected to a conventional drawbar 15, which is in turn adapted to be connected to the rear of a tractor or truck (not shown) which is used for pulling the vehicle. The body frame 5 and the wheel supporting frame 7 may be of any suitable type and, as shown in the drawings, generally comprise a plurality of longitudinally spaced members 17 and 19, respectively, and transverse channel members 21 and 22, respectively.

The fifth wheel 9 is connected to the body frame 5 by means of a circular plate 23 which is rigidly secured to the transverse channels 21 of the body frame. A similar circular plate 25 is secured to transverse channels 22 of the wheel supporting frame 7 for securing the fifth wheel to that frame. A second circular plate 27 is welded to the top of the circular plate 23 at the center thereof, and is recessed as at 29 to receive a hub 31 which is welded to the circular plate 27 and extends downwardly through both the plate 27 and plate 23. The hub 31 is recessed in the center thereof as at 33 and a circular collar 35 is press fitted therein with its bottom edge flush with the bottom of the hub. The hub 31 likewise has an axial opening 37 therein passing through its center through which a bolt 39 is inserted for a use which will be hereinafter described.

A circular plate 43 is welded to the lower surface of the plate 25 in the center thereof, in substantial vertical alignment with the circular plate 27 welded to the plate 23. Plate 43 is recessed in the center thereof as at 44 and a hub 45 is inserted through the recess and welded to the plate. The hub 45 extends through the recess 44 into the recess 33 in the hub member 31. A collar 47 is press fitted on the outside of the hub 45 and is positioned adjacent to and axially aligned with the collar 35 which is pressed into the hub 33. The collar 47 is coaxial with the collar 35 and a slight clearance is provided between the outer periphery of the collar 47 and the inner periphery of the collar 35. These two collars 35 and 47 act as wear sleeves for the fifth wheel as will hereinafter be more fully explained. The hub 45 is provided with an axial opening 49, which is aligned with the opening 37 in the hub 31 and likewise receives the bolt 39. A lock nut 51 is threaded on the end of the bolt 39 and seats against a washer 53 which abuts the end of the hub 45. Thus, it will readily be seen that the bolt 39 and nut 51 rotatively connect the vehicle body frame 5 to the wheel supporting frame 9 so that they may be rotated relative to each other.

Outwardly of the hub 31 and resting upon the top of the circular plate 25 are a plurality of circular disks 53 which act as wear plates for the fifth wheel as will be more fully explained hereinafter. These disks 53 are placed one on top of another and in the embodiment shown in the drawings five such disks are employed. The disks are recessed at their center as at 55 so that they may fit over the hub 31 and lie flat on the plate 25. Still another circular plate 57 is positioned upon the top of the uppermost wear plate disk 53 and likewise is recessed as at 59 to fit over the hub 31 and rest upon the top of these wear plates. A riser bar 61 is positioned between the circular plate 57 and the circular plate 23 and is welded to both these plates. This riser bar 61, as can be seen in Figure 4, is formed in a generally cross-shaped manner so that the outer extremity of each of its rounded cross arms 63 comes substantially to the outer edge of the plate 57. The inner rounded edges of the cross arms 63 substantially abut the outer periphery of the hub 31. This form of riser bar provides substantially uniform support between the two plates with a minimum of size and weight for the riser bar.

Outwardly of the riser bar is provided a sealing unit generally indicated at 65. This unit comprises a circular collar 67 welded to the underside of the plate 23 at the outer extremity thereof. The plate 25 likewise has an annular collar 69 welded to the inner surface thereof and extending upwardly therefrom. This collar 69 is positioned inwardly of the collar 67 and a dust felt or oil seal 71 is positioned inwardly of the collar 67 and has its lower end abutting the upper end of the collar 69. Another collar 73 is provided on the inner side of the seal 71 from the collar 67 and is welded to the plate 23. This collar aids in positioning and securing the oil seal in place. The housing formed by the upper and lower plates and the end walls thereof may be supplied with lubricating oil through a filler hole 72 in plate 23, which is sealed by filler plug 74. It will thus be seen that the oil seal prevents the leakage of any lubricant from within the housing of the fifth wheel and prevents the ingress of dirt into the housing.

The wear plate 53 which is lowermost and which is resting upon the plate 25 is provided with radially extending slots 75. Some of these slots extend inwardly from the outer periphery of the wear plate and some extend outwardly from the inner periphery thereof. The wear plate above the one just described is not provided with any slots, but the one thereabove is, and so on, so that the wear plates are alternately provided with slots. In this way, each wear plate will be satisfactorily lubricated.

When the fifth wheel has been completely assembled, the housing formed by the plates 23 and 25 and their respective end walls may be supplied with lubricating oil. This oil will flow to all parts of the fifth wheel such as between the annular wear rings 35 and 47 to provide lubrication therebetween when the body frame rotates relatively to the wheel supporting frame. Likewise, this lubricating oil will flow into the slots in the wear plates and lubricate each of the wear plates. As the lubricating oil is sealed in by the oil seal 71, it cannot escape and should be capable of satisfactorily lubricating the entire fifth wheel during its life.

It will be noted that due to the large surface of the wear plates 53 and the fact that they may turn independently, or together, the wear will be distributed over a large surface and will add great length to the life of the fifth wheel itself. Likewise, it will readily be seen that sealing of the lubricating oil into the fifth wheel prevents the ingress of any dirt into the operating parts and eliminates the need which has heretofore been necessary of constantly lubricating and oiling the operating parts to provide for their satisfactory operation. The annular collars 35 and 47 which act as vertical wear sleeves are adapted to absorb the shock caused by the pull on the fifth wheel by the truck or tractor which draws the trailer. Also, these vertical wear sleeves aid in maintaining the vertical alignment between the upper and lower sections of the fifth wheel and provide vertical bearing surfaces when rotation between the upper and lower surfaces occurs.

While only one particular embodiment of this invention has been described, it is to be understood that it is not to be restricted thereto and that it is intended to cover all modifications thereof which will be apparent to one skilled in the art and which come within the spirit and scope of the appended claims.

I claim:

1. A fifth wheel for rotatively mounting a vehicle body to a wheel supporting frame including a housing adapted to contain lubricant, said housing comprising an upper circular plate connectable to said body, a lower circular plate connectable to said wheel supporting frame, means rotatively interconnecting said plates, peripheral walls on each of said plates, sealing means positioned between said walls for sealing said housing, horizontal wear plates supported on said lower plate, an integral tubular spacer member having portions projecting radially outwardly with respect to a central opening therein connected to the underside of said upper plate, a circular plate connected to the underside of said spacer and engaging said wear plates for rotation thereon, a vertical wear sleeve connected to said upper plate and a vertical wear sleeve connected to said lower plate coaxial with and adjacent to said first named wear sleeve.

2. A fifth wheel for rotatively mounting a vehicle body to a wheel supporting frame including a housing adapted to contain lubricant, said housing comprising an upper wall connected to said body, a lower wall connected to said wheel supporting frame, means rotatively interconnecting said walls, end walls connected to each of said first named walls, sealing means positioned between said end walls for sealing said housing, a plurality of horizontal wear plates mounted on said lower wall and placed one on top of another, means connected to said upper wall engaging said wear plates for rotation thereon, a vertical wear sleeve detachably connected to said upper wall and a vertical wear sleeve detachably connected to said lower wall coaxial with and adjacent to said first named wear sleeve.

3. A fifth wheel for rotatively mounting a vehicle body to a wheel supporting frame including an upper circular plate connected to said body, a lower circular plate connected to said wheel supporting frame, a hub member extending vertically through the center of said upper plate and rigidly connected thereto, a second hub member connected to and extending vertically through said lower plate into spaced relation with said first hub member, an annular collar connected to each of said hub members with the outer periphery of one collar adjacent the inner periphery of the other collar, connecting means passing through said plates and hubs for rotatively connecting said upper and lower plates, a plurality of circular disks resting upon said lower plate, a circular plate resting upon the uppermost circular disk, a spacer member rigidly secured to said upper plate and said last named circular plate, end walls connected to said upper and lower plates outwardly of said circular disk, and sealing means positioned between said end walls for sealing the same.

GEORGE A. KENDALL.

REFERENCES CITED

The following references are of record in the file of this patent:

UNITED STATES PATENTS

| Number | Name | Date |
|---|---|---|
| 1,094,185 | Adams | Apr. 21, 1914 |
| 1,485,799 | Miner | Mar. 4, 1924 |
| 1,486,143 | Hovey | Mar. 11, 1924 |
| 2,154,799 | Young | Apr. 18, 1939 |